Sept. 17, 1963  G. E. GROSS  3,103,788
METHOD FOR DIMINISHING WAVE HEIGHTS
Filed March 18, 1959
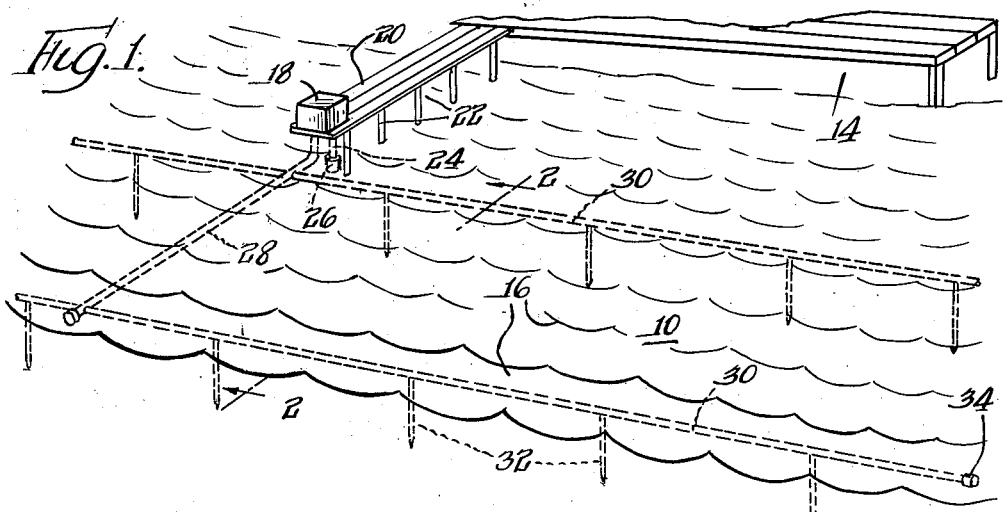
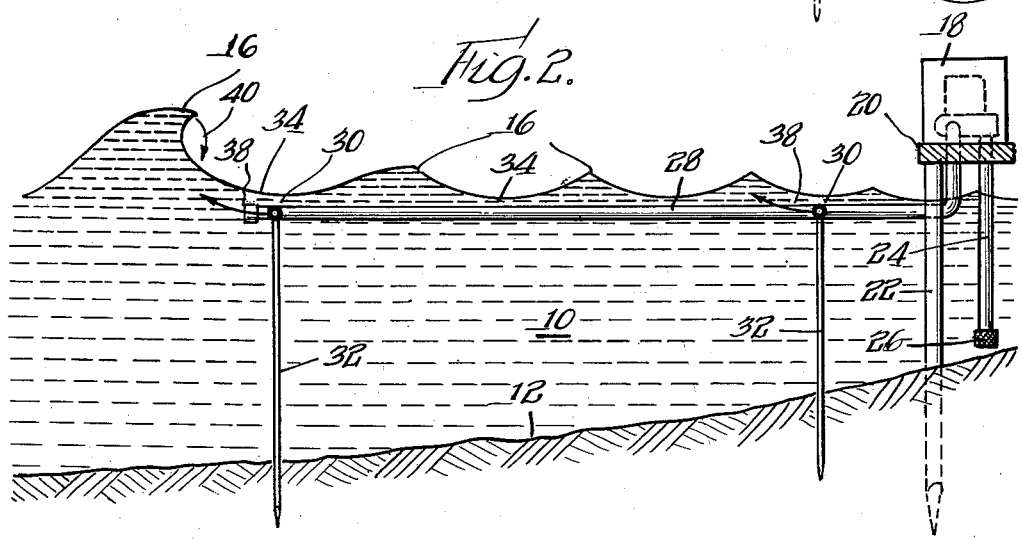
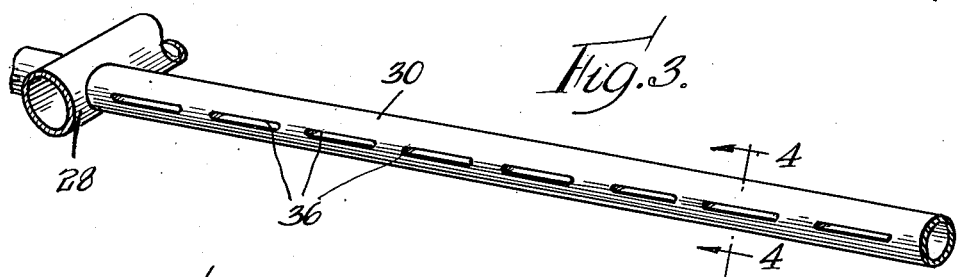
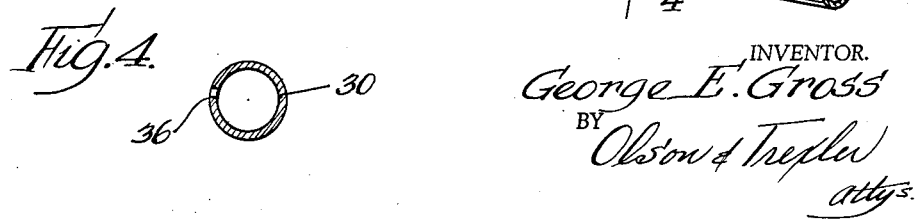
INVENTOR.
George E. Gross
BY Olson & Trexler
attys.

United States Patent Office 3,103,788
Patented Sept. 17, 1963

3,103,788
METHOD FOR DIMINISHING WAVE HEIGHTS
George E. Gross, Oak Park, Ill.
(830 Clark Lane, Des Plaines, Ill.)
Filed Mar. 18, 1959, Ser. No. 800,156
2 Claims. (Cl. 61—6)

This invention relates to wave control and particularly to simple and economical means for eliminating or substantially reducing waves, as on a lake, ocean, or the like.

Waves in large bodies of water (and sometimes in small ones) cause no end of trouble. They make swimming difficult and often lead to a dangerous undertow. Waves often seriously damage shore installations such as piers and boat houses, and frequently erode the shoreline. Small boats can find the going difficult. Wave conditions can mean the difference between success and failure of a military landing operation. Loading and unloading of small boats at piers can be difficult or impossible.

Accordingly, it is an object of this invention to provide an improved apparatus and method for eliminating or greatly reducing the magnitude of waves.

More particularly, it is an object of this invention to provide such an apparatus and method which eliminate the usual massive and expensive breakwaters.

A further object of this invention is to provide a mobile wavebreaker for reducing wave magnitude in a localized area.

Another object of this invention is to provide an apparatus and method for causing waves to tumble over into the preceding troughs whereby greatly to reduce the magnitude of the waves.

Specifically, it is an object of this invention to provide an apparatus and method for discharging water below the level of troughs between waves in opposition to the movement of the waves, whereby to cause the waves to tumble over and diminish greatly in magnitude.

I have observed that water at different temperatures acts as if it has different viscosities and resists mixing, a stream of water at one temperature discharged into a body of water at a different temperature tends to remain as a coherent stream without mixing with the body of water.

Therefore, a more specific object of this invention is to provide an apparatus and method for discharging water at one temperature into wave water in opposition to the waves to cause the waves to topple over.

Other and further objects and advantages of the present invention will be apparent upon consideration of the following description when taken in connection with the accompanying drawings, wherein:

FIG. 1 is a perspective view of a wave breaking apparatus in accordance with this invention;

FIG. 2 is a side view thereof, partly in section as taken along the line 2—2 in FIG. 1;

FIG. 3 is a perspective view of a water-discharge device as used in the invention; and FIG. 4 is a cross-sectional view through the device of FIG. 3 as taken along the line 4—4 thereof.

Referring now in greater particularity to the drawings, there will be seen a large body of water 10, such as an ocean or large lake, and having a bottom 12 and a shore 14 which is to be protected. The body of water 10 has waves 16 on the surface thereof. The waves may vary in height and spacing according to various factors, including the size of the body of water, the location of the part of the body of water under consideration, and conditions of climate and weather. The waves progress toward the shore, to the right in FIG. 2 and generally up and to the right in FIG. 1.

The wave breaking apparatus according to this invention includes a motor-pump unit 18 supplied with power from a suitable source. This unit is shown as mounted on a pier 20 having supporting posts 22 and extending from the shore out into the water. The posts 22 are shown as having spiked or sharpened lower ends for facile installations of the pier—as for an installation that is to be installed quickly. Alternatively (and preferably), the motor-pump unit 18 could be sealed and disposed on the bottom 12, or it could be floated on the surface by suitable float means for temporary installations, such as for military landings. The motor pump unit 18 is provided with an intake pipe 24 having a screened inlet 26. The inlet 26 is in the water, and for best results is disposed near the bottom 12 thereof.

The motor-pump unit 18 is provided with a discharge pipe 28 running out from the shore and having one or more transverse jet pipes 30. The jet pipes 30 as oriented substantially parallel to the wave crests (perpendicular to the direction of wave movement). In general, this is substantially parallel to the shore. The jet pipes are supported horizontally by stakes 32 driven into the bottom 12 and are disposed below the wave troughs a distance depending on wave conditions. Of course, for portable installations such as military landings, the jet pipes could be supported by floats. Alternatively, the pipes could be made of suitable lightweight material with integral air chambers, if necessary. Ropes or cables from such floating pipes preferably would be tied to anchors resting on the bottom to minimize bubbling up and down of the pipes.

The jet pipes 30 are closed at the ends as at 34 and are provided with openings which preferably may take the form of longitudinal (horizontal) slots 36. Hence, water from the motor-pump unit 18 issues from the slots 36 as streams, ribbons or jets as indicated by the arrows 38. These jets are generally horizontal, being disposed from about 10° above to about 10° below horizontal. The jets are generally in opposition to the direction of wave movement, but may be in diagonal opposition. The water jets act as a sort of underwater breakwater, slowing down the undersides of the waves and upsetting the natural forces in the waves to cause the tops or crests thereof to tumble over into the preceding troughs as indicated by the arrow 40.

It is difficult to state generalities as to sizes and positions since these are so dependent on wave conditions and the area to be protected. However, it may be stated that the jet pipes must be disposed below the surface of the water at the bottoms of the troughs, but close enough to the trough bottoms to be within the zone of wave action. As one specific example a jet pipe disposed three inches below the trough bottoms reduces 18 inch waves on the jet or offshore side of the jet pipe to eight inches on the back or onshore side. Small, wind driven waves were completely eliminated. A second jet pipe may be used (as illustrated) further to reduce the height of the waves. Larger slots and/or a larger pump may be provided for greater reduction of wave height. Obviously, installation should be below the draft of small boats, with suitable spacing apart to accommodate larger vessels.

The piping system heretofore shown and described is excellent for reducing waves in fairly large areas. If it is desired to reduce wave height in only a local area, as for unloading and loading small boats at a pier, then most of the piping could be eliminated. In fact, the motor-pump unit could be used alone, submerged to the proper depth, and this would make for ready portability.

Elimination or substantial elimination of waves in accordance wtih the foregoing greatly improves swimming and boating, and protects shore installations and shores themselves. Furthermore, undertow is eliminated. Installation is simple and inexpensive. Operation also is inexpensive, and is necessary only when waves tend to exceed a predetermined size, or when wave control is otherwise desired.

The example of the invention as herein shown and described is to be considered as illustrative only. Various changes in structure will no doubt occur to those skilled in the art and are to be considered as forming a part of this invention insofar as they fall within the spirit and scope of the appended claims.

The invention is claimed as follows:

1. The method of diminishing wave height in a body of water having waves therein traveling in a given direction which comprises pumping from a fixed point of discharge a plurality of substantially parallel streams of water from said body of water substantially horizontally only in opposition to the direction of oncoming wave movement in a range from slightly above to slightly below horizontal and maintaining said streams at a fixed depth just below the surface of the lowest point of wave troughs.

2. The method set forth in claim 1 wherein the step of pumping streams of water comprises pumping streams of water that are wider horizontally than they are high vertically.

References Cited in the file of this patent

UNITED STATES PATENTS

| | | |
|---|---|---|
| 279,901 | Martine | June 19, 1883 |
| 843,926 | Brasher | Feb. 12, 1907 |
| 1,207,990 | Otto | Dec. 12, 1916 |
| 1,716,616 | Brasher | June 11, 1929 |
| 2,325,937 | Brasher | Aug. 3, 1943 |
| 2,534,817 | Hedden | Dec. 19, 1950 |

FOREIGN PATENTS

| | | |
|---|---|---|
| 18,369 | Great Britain | 1905 |
| 358,737 | France | Dec. 28, 1905 |
| 442,046 | France | June 10, 1912 |
| 563,740 | France | Oct. 3, 1923 |
| 309,121 | Italy | June 26, 1933 |